United States Patent Office 3,499,759
Patented Mar. 10, 1970

3,499,759
LIGHT-SENSITIVE REPRODUCTION LAYER COMPRISING AN OXETANE POLYMER
Herbert Maar, Wiesbaden, Hartmut Steppan, Wiesbaden-Dotzheim, Günter Messwarb, Kelkheim, Taunus, and Walter Lüders, Neu-Isenburg, Germany, assignors to Kalle Aktiengesellschaft, Wiesbaden-Biebrich, Germany, a corporation of Germany
No Drawing. Filed July 3, 1968, Ser. No. 742,189
Claims priority, application Germany, July 6, 1967, K 62,742
Int. Cl. G03c 1/68, 5/00
U.S. Cl. 96—35.1            23 Claims

---

ABSTRACT OF THE DISCLOSURE

This invention relates to a light-sensitive reproduction layer for use in the preparation of printing forms, photographic copies, relief images, tanned images, and pigment images, which layer comprises at least one homopolymer or copolymer of an oxetane of the following general formula

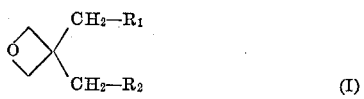

in which:

$R_1$ is one of the following groups:

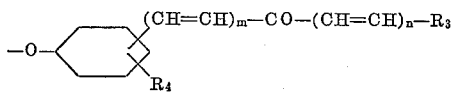

and

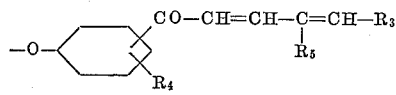

$R_2$ is hydrogen, halogen, or an alkyl, alkoxy or aryloxy group, or the group $R_1$,
$R_3$ is a carbocyclic or heterocyclic aromatic group linked through a carbon atom of the ring,
$R_4$ is hydrogen, halogen, or an alkyl or alkoxy group,
$R_5$ is chlorine or a phenyl group,
$m$ is 0 or 1, and
$n$ is 0 or an integer from 1 to 4.

The co-monomer may be at least one non-light-sensitive oxirane, oxetane, or oxolane compound, which may be substituted, if desired.

---

The present invention relates to a light-sensitive reproduction layer which consists of or contains novel polyethers capable of being cross-linked by the action of light.

Numerous polymeric compounds are already known which, either in the main chain or in side chains, contain groups which impart to them the property of being cross-linked by the action of light and, thereby, become either insoluble or less readily soluble. However, many of these polymers have the disadvantage that they are relatively easily saponified, i.e. split, by contact with acid or alkaline solutions. Thus, it may happen that the reduced solubility caused by cross-linking may be, at least partially, undone.

Difficultly saponifiable polymers which can be cross-linked by the action of light also have been described, e.g., in U.S. patent specifications Nos. 2,716,097, 2,716,102, 2,716,103, and 2,861,058. However, for their preparation, light-active groups must be later introduced, in a cumbersome manner, into readily prepared, non-light-sensitive polymers. In most cases, the reaction conditions required for the introduction of these groups are very severe (e.g. Friedel-Crafts reaction), so that complications, such as decomposition reactions, rearrangements, and other undesirable side reactions, must be reckoned with.

The present invention provides a light-sensitive reproduction layer suitable for the preparation of printing forms, photographic copies, relief images, tanned images and pigment images, which consists of or contains, as the light-sensitive substance, polymers containing photoactive groupings, and which also contains at least one homopolymer or copolymer of an oxetane corresponding to the general Formula I

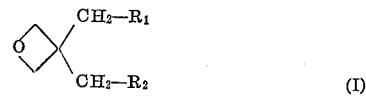

wherein:

$R_1$ is one of the following groups:

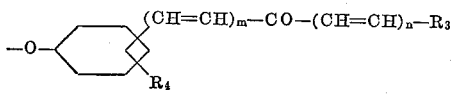

and

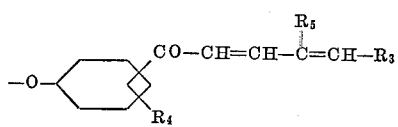

$R_2$ is hydrogen, halogen, an alkyl, alkoxy or aryloxy group, or the group $R_1$,
$R_3$ is a carbocyclic or heterocyclic aromatic group linked through a carbon atom of the ring,
$R_4$ is hydrogen, halogen, or an alkyl or alkoxy group,
$R_5$ is chlorine or a phenyl group,
$m$ is 0 or 1, and
$n$ is 0 or an integer from 1 to 4, the co-monomer used consisting of at least one non-light-sensitive oxirane, oxetane, or oxolane compound, which may be substituted. Propylene oxide, styrene oxide, compounds corresponding to Formula II

wherein X is hydrogen, halogen, or an alkyl, alkoxy or aryloxy group; tetrahydrofuran, and 1,4-epoxy-cyclohexane are preferred as non-light-sensitive co-monomers.

Alternatively, oxetanes of Formula II also may be used in which X may be a cyano or acyloxy group, for example. Although such groups can be saponified relatively easily, they do not materially impair the properties of the finished polymers, because neither a main chain nor a cross-linkable chain are split off during their saponification.

The substituent $R_3$ in the general Formula I, particularly if it is a carbocyclic radical, may be further substituted in the aromatic nucleus, e.g. with alkyl groups preferably having from 1 to 4 carbon atoms, with alkoxy groups preferably having from 1 to 4 carbon atoms, or with nitro groups or halogen atoms. Two of such substituents also may be combined by ring closure to form, e.g., a methylene dioxy group. Phenyl, 4-methyl phenyl, 4-isopropyl-phenyl, methylene-dioxy-(3,4)-phenyl, 4-azido-phenyl and thienyl-(2) groups are preferred as substituents at $R_3$.

The polymers to be used according to the invention include block polymers with the monomer units arranged in a head-to-tail arrangement, copolymers in which the light-active components is contained in a statistical distribution, and polymers which resemble all kinds of mixed types in the arrangement of their monomer units and in their steric structure.

The light-sensitive component I should be incorporated in the polymer in a quantity of at least 0.01 mole percent, preferably more than 0.1 mole percent.

Since the capability of being cross-linked by light action increases with an increasing content of light-sensitive component, polymers having a content of photo-active component of more than 1 mole percent are of particular interest, with the extreme case, i.e. that of a homopolymer of the photo-active compound, being distinguished by particularly favorable cross-linking properties.

Among the more favorable embodiments of the invention are reproduction layers containing a polymer of an oxetane corresponding to the general Formula I in which the sum of $m+n$ is at least 1, but not greater than 2, when $m$ is 1. Among these, such reproduction layers are particularly useful which contain polymers of an oxetane of the general Formula I in which $m$ is 0, $n$ is 2 or 3, and $R_2$ is hydrogen, halogen or alkyl; also in the case of copolymers containing at least 10 mole percent of groups derived from an oxetane corresponding to the general Formula I of this kind, excellent results are obtained.

Technically, the compounds according to the invention have the advantage that the photo-active polyethers to be used according to the invention can be saponified only with difficulty and that the gentle reaction conditions prevailing during their preparation render it possible to employ also thermolabile photo-active oxetanes, so that the properties of the polymers thus prepared, as regards their capability of being cross-linked under light-influence and their solubility and consistency, may be varied within wide limits. Thus, it is possible, due to the low reaction temperatures of preferably from 0 to 30° C., to use oxetane derivatives containing azide groups as photoactive components for the preparation of the polymers, e.g., and to produce in this manner compounds which excel by particularly good photo-cross-linking properties. Varying the kind and quantity of the photo-inactive comonomers used for the copolymerization offers another possibility to vary the properties of the polymers with regard to consistency, solubility and photo-cross-linking capability. Thus, the copolymerization of a certain photoactive oxetane with tetrahydrofuran yields softer and more easily soluble products than does the copolymerization of the same photo-active oxetane with 3,3-bis-chloromethyl-oxetane. If tetrahydrofuran and 3,3-bis-chloromethyl-oxetane are used simultaneously as co-monomers, further gradations in the properties of the copolymers may be achieved.

The reproduction layers according to the invention may be used in many fields with very good success.

The novel reproduction layers according to the invention may be disposed on any kind of supports, e.g. metal (single metal plates or multi-metal plates), plastic, glass, ceramics, or paper. They may be used for many purposes, e.g. for the preparation of printing plates, in particular for relief and intaglio printing, and also for offset printing. Furthermore, the new reproduction layers are particularly suited for the production of printed circuits (etched resists). The reproduction layers according to the invention also may be used for the preparation of originals for transfer printing.

A further field of application for the reproduction layers of the invention is the preparation of individual copies on various supporting materials, either by the contact process or by projection, e.g. by reenlargement from microfilms. Further, the reproduction layer of the invention may be used for applying image patterns or text to machine housings, glass or ceramics, e.g., which then may be burned in after a suitable pigment or enamel color has been applied. Alternatively, dyestuffs, pigments, or phosphors may be directly incorporated in the reproduction layer. In this case, the areas of the layer not struck by light during exposure may be washed away so that colored images are obtained, which then may be burned in, if desired (tanned and relief images, even Braille).

When the process of the invention is used for decorating ceramics, it should be noted that, contrary to known processes, decorating is performed by a negative-working pigment process. On transparent supporting materials, colored copies also may be prepared from color separation negatives, which may be combined by superposition to form a colored image.

The reproduction layers of the invention may be combined with known reproduction layers. Thus, the photoactive polyethers may be incorporated in other reproduction layers, e.g. diazotype layers or photopolymerizable layers.

The photoactive polymers to be used according to the invention for the production of reproduction layers are prepared by homo- or copolymerization of the above described monomeric compounds in the presence of cationic catalysts which cause ring opening of the cyclic ethers under the polymerization conditions. $BF_3$-etherate, phosphorus pentafluoride, and trialkyl oxonium salts, such as triethyl oxonium tetrafluoroborate, are very suitable as catalysts. Frequently, it is of advantage to add epichlorohydrin to the polymerization mixture after the catalyst, e.g. $BF_3$-etherate, has been added, in order to initiate polymerization. The polymerization process may be performed at a temperature of 0 to 30° C., for example. Solvents which are inert under the polymerization conditions, such as chloroform or methylene chloride, may be present.

Exemplary of monomers corresponding to the general Formula I above which are suitable for the preparation of the polymers to be used according to the invention are as follows:

Formula 1

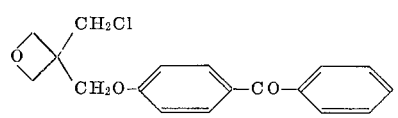

Formula 2

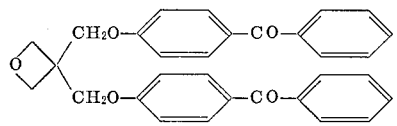

Formula 3

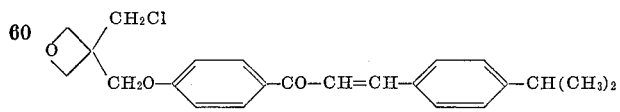

Formula 4

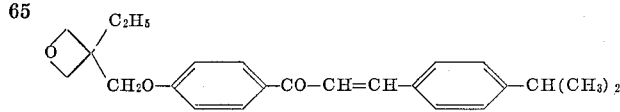

Formula 5

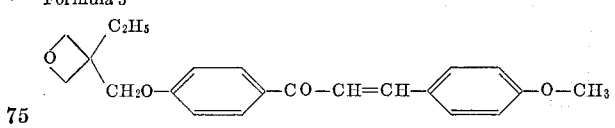

Formula 6
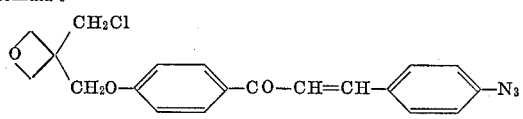

Formula 7
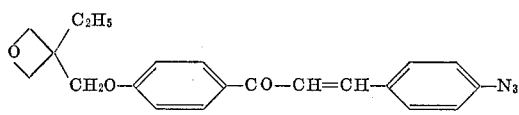

Formula 8
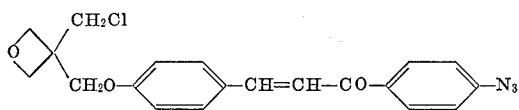

Formula 9
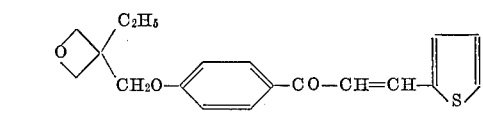

Formula 10
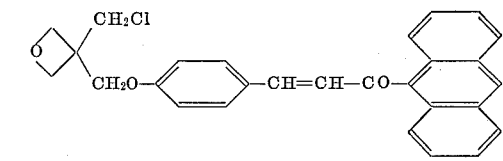

Formula 11
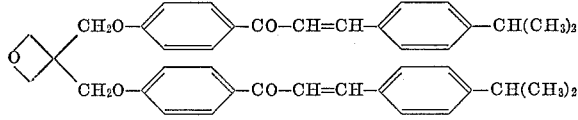

Formula 12
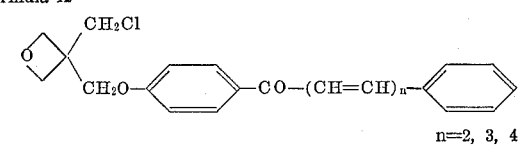

n=2, 3, 4

Formula 13
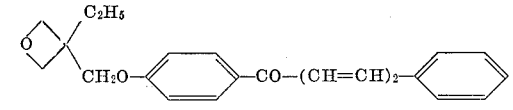

Formula 14
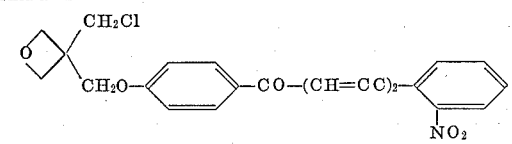

Formula 15
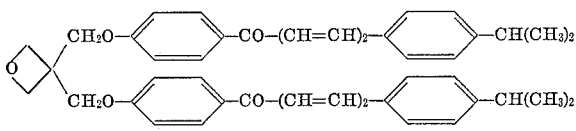

Formula 16
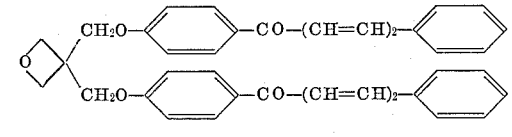

Formula 17

Formula 18

Formula 19

Formula 20

Formula 21

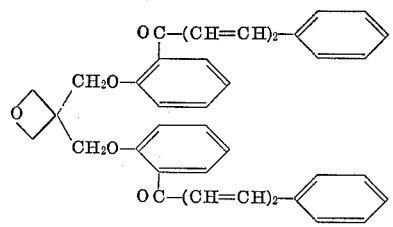

Exemplary of photo-inactive co-monomers are: propylene oxide, styrene oxide, 3,3-bis-phenoxymethyl-oxetane, 3,3 - bis - chloromethyloxetane, 3,3-bis-iodine-methyl-oxetane, 3,3 - bis - cyanomethyloxetane, 3,3-bis-acetoxy-methyl-oxetane, tetrahydrofuran, and 1,4-epoxy-cyclohexane.

By exposure of the polymers to light of a wavelength between 200 and 700 nm., their solubility in solvents which dissolve the unexposed polymers is reduced or destroyed. Such light sources are particularly suitable, the emitted radiation of which contains a high proportion of ultra-violet light, e.g. in the range from 300 to 400 n. Further, all types of lamps customarily used in reproduction processes may be used as light sources, e.g. carbon arc lamps, xenon lamps, mercury vapor lamps, and actinic and superactinic luminous substance lamps. Sunlight is also very suitable.

Image-wise exposure of the reproduction layer according to the invention may be effected with varying exposure times and in different ways, depending on the combination of substances present, the supporting material used, and the desired result. The exposure time may range from a few seconds to about 20 minutes.

For the preparation of the reproduction material, reproduction layers according to the invention are applied to the support in known manner, e.g. by coating, whirl-coating, swabbing, dip-coating, or roller application, and then dried. Especially when thicker layers are to be applied, it may be advisable to provide the support with an antihalation layer before coating. Additives known from other reproduction materials, such as dyestuffs, sensitizers known to be suitable for sensitizing chalcone and cinnamic acid derivatives, pigments, wetting agents, plasticizers, anti-oxidants, and stabilizers against thermal decomposition, and also organic and inorganic fillers, may be incorporated in the reproduction layers. Suitable organic fillers include photo-inactive polyethers, e.g. homopolymers or copolymers of various epoxides or other polymers which are compatible with the photo-active polyethers, e.g. those of the vinyl polymer series. Suitable inorganic fillers include glass beads or silicon dioxide in extremely fine distribution. However, it is of advantage to select these additives in such a manner that they do not substantially reduce the optical transparency of the reproduction layer in the main range of absorption of the light-sensitive copolymers. Normally, the total quantity of additives should not exceed 30 to 40 percent, but in individual cases, in particular in the case of copolymers containing azide groups or benzophenone groups, substantially higher additions, such as of 99 percent and more, are also possible, as is illustrated in Example 1 below.

Depending on the type of light-sensitive polymer used, development of the image-wise exposed reproduction materials may be effected with organic solvents, e.g. with carboxylic acid esters, such as methyl acetate or ethyl acetate, with aliphatic ketones, such as methyl ethyl ketone or acetone, with aromatic hydrocarbons, such as benzene or toluene, or with ethers, such as dioxane or tetrahydrofuran, or with mixtures of such organic solvents with one another. Water, alcohols (methanol, ethanol or propanols), or water-alcohol mixtures may be used for development only in such cases, where the reproduction layer contains, in addition to the light-sensitive polyether, a sufficient quantity of a polymer which is soluble in these solvents or solvent mixtures, e.g. polyethylene oxide.

If they do not already contain dyestuffs, the exposed areas of the layer may be dyed later, e.g., depending on the characteristics of the particular layer, with aqueous dyestuff solutions, with solutions of dyestuffs in organic solvents, or with greasy printing inks, in order to improve the visibility of the image produced on the material.

In a preferred modification of the method for dyeing the image, which is particularly suitable for producing single copies from water-developable reproduction layers the dry layer is dyed, after exposure, with a very finely pulverized organic or inorganic pigment and then developed by spraying with water. During the spraying process, the pigment is removed much earlier from the areas not struck by light than from the light-struck areas. By this process, sharp copies which are fast to light may be produced in any desired color with short exposure times.

Particularly in the case of the above described pigment process, but also when other processing methods are employed, the following should be noted: It is possible, but not advisable, to use a supporting material with an extremely smooth surface. Advantageously, the support should be superficially roughened by mechanical or chemical methods, because this improves the adhesion of the reproduction layer. A surface which is particularly suitable is electrolytically roughened aluminum foil. Since the functioning of the reproduction layers according to the invention can be demonstrated on this kind of support without annoying problems of adhesion, this support has been used in preference in the following examples.

Especially when the pigment process is to be performed, a reproduction layer of sufficient thickness must be applied that all protruding grain peaks of the support are completely covered by the reproduction layer. Otherwise, the pigment would be held by the uncovered grain tops, from which it could be removed only with difficulty, or not at all, in the ensuing washing process. The smoother the surface, the thinner the reproduction layer which can be employed, which is a particular advantage because of the shorter exposure times applicable. An unduly extended exposure time may reduce the receptivity of the light-struck areas for the pigment and their anchorage thereto. When development is effected with a water spray, as low as possible a water pressure is advantageously employed. In the case of layers the developability of which is unknown, development preferably is begun at a very low water pressure, which is then increased until development proceeds with satisfactory speed and safety. As an incidental result of this process, the pigment adhering to the light-struck areas is covered with a solution of the unexposed reproduction layer in water. Consequently, a pigment copy is obtained upon drying which is relatively fast to marring. The fastness to marring and wiping may be further increased by subjecting the copy to a brief after-exposure.

The invention is further illustrated by the following examples. Parts by weight are grams and parts by volume are milliliters. Percentages are by weight unless otherwise stated. The temperatures are stated in degrees centigrade.

EXAMPLE 1

0.75 part by weight of a copolymer prepared from 50 percent of tetrahydrofuran and 50 percent of the compound corresponding to Formula 2 above was dissolved in 25 parts by volume of benzene. 15 parts by weight of a 5 percent solution in benzene of polyethylene oxide (molecular weight approximately 4,000,000) were added to the solution. On a plate whirler, an electrolytically roughened aluminum foil was coated with the solution thus obtained. After the foil had been dried for 5 minutes at 100° C., it was exposed for two minutes under a negative line original, using a 40 amp carbon arc lamp at a distance of 110 cm. and a conventional vacuum printing frame. The layer was rubbed in with Paratoner B (Schultz' "Farbstofftabellen," 7th edition, vol. I, 1931, No. 60) and then treated with a water spray until the pigment adhering to the areas not struck by light had been washed away, while it adhered to the exposed areas of the layer. A red positive copy on a clean background was thus obtained. An only insignificantly weaker differentiation is achieved with an exposure time of only 20 seconds.

If, however, the copolymer is replaced by 0.75 part by weight of the compound coresponding to Formula 2, only a very weak differentiation is achieved under otherwise identical conditions. If the layer consists of polyethylene oxide alone, no differentiation at all is achieved under the conditions stated above. A distinct differentiation is, however, still achieved with an exposure time of 2 minutes, when the layer contains only 0.1 percent of the above copolymer, calculated on the quantity of polyethylene oxide present.

The copolymer used above was prepared by dissolving 5 parts by weight of the compound corresponding to Formula 2 in 5 parts by weight of tetrahydrofuran and 16 parts by volume of absolute chloroform under a nitrogen atmosphere, using a three-necked flask provided with a stirrer. While cooling with ice, first 1 part by volume of $BF_3$-etherate and then 0.5 part by volume of epichchlorohydrin were added. After the mixture had been standing for one day at 4° C., half these quantities of $BF_3$-etherate and epicholorohydrin were added in this sequence, and the reaction mixture was again allowed to stand for a day at 4° C. The solution thus produced was of medium viscosity. It was mixed with about 50 parts by volume of water and with triethyl amine, until the color did not become any lighter. By introducing water vapor into the solution, chloroform and any residual tetrahydrofuran were expelled. After the residue had been dried at 40 to 50° C. under reduced pressure (20 mm. Hg), it formed a light, almost colorless oil.

EXAMPLE 2

An electrolytically roughend aluminum foil was coated on a plate whirler with a 3 percent solution in dioxane of a coplymer which had been prepared analogously to the method described in Example 1 from 4 parts by weight of 3,3-bis-chloromethyl-oxetane, 2 parts by volume of absolute tetrahydrofuran, and 4 parts by weight of the compound of Formula 7.

The foil is exposed for 40 seconds under a negative screen original (light source: 40 amp carbon arc lamp; distance: 110 cm.), developed by wiping with a cotton pad soaked in acetone, acidified by means of a 1 percent phosphoric acid solution, and inked up with greasy printing ink. Thereafter, the plate may be used as a positive offset plate.

EXAMPLE 3

A copper plate was immersed for 10 minutes in dilute nitric acid (4 parts by volume of concentrated $HNO_3$ in 400 parts by volume of water), rinsed with distilled water, dried with warm air, and then coated on a plate whirler with a 5.5 percent solution in trichloroethylene of the copolymer described in Example 2. The plate was exposed for 4 minutes under a positive screen original, using a 40 amp carbon arc lamp at a distance of 110 cm. After it had been developed by immersion in acetone, the plate was dried for 10 minutes at 100° C. and then etched in an iron-(III)-chloride bath of 40° Bé., a half-tone block being obtained.

If the plate is exposed under a negative master, with the other conditions remaining unchanged, a positive copper relief printing plate is obtained after etching with an iron-(III)-chloride solution.

EXAMPLE 4

0.75 part by weight of the copolymer described in Example 2 was dissolved in 12.5 parts by volume of trichloroethylene. The copper layer of a copper-laminated plastic plate was coated with this solution on a plate whirler. The plate was exposed under an original showing a negative of a wiring diagram in a tube illuminating apparatus (Printaphot, containing 6 Philips luminous substance tubes TLA 20 W/05 on a surface of 50 x 50 cm.; distance from the light source: 5 cm.), developed by immersing it in acetone, dried for 10 minutes at 100° C., and then etched with an iron-(III)-chloride solution of 40° Bé., until the bared copper was removed. The hardened polymer was removed by treating the plate with a mixture of precipitated chalk and acetone, and a printed circuit was thus obtained.

EXAMPLE 5

0.37 part by weight of the copolymer described in Example 2 was dissolved in 12.5 parts by volume of dioxane, and the solution was then coated onto the hydrophilic surface of a polyethyleneglycol terephthalate film one surface of which had been pre-treated with trichloroacetic acid and provided with a hydrophilic layer of polyvinyl alcohol hardened with dimethylol urea, $TiO_2$ and $SiO_2$. The proportion by weight of $SiO_2$ to $TiO_2$ was 1:2, and that of polyvinyl alcohol to pigment 1:5. The plate was exposed for 2 minutes under a negative line original, using the tube illuminating apparatus described in Example 4, developed by gently rubbing with a cotton pad soaked in acetone, and then inked up with greasy ink. The film thus produced could be used as an offset printing plate.

A paper printing foil prepared in accordance with Example 1/D of DAS (German published patent application) No. 1,199,789, may be used analogously for the preparation of an offset printing plate.

EXAMPLE 6

A copolymer, prepared from 24 parts by weight of 3,3-bis-chloromethyl oxetane and 19.7 parts by weight of the chalcone of Formula 8 in accordance with the procedure of Example 1, was used, in a 6 percent solution in dioxane, for coating a cleaned zinc plate. The plate was exposed for 6 minutes under a screen negative in the tube illuminating apparatus used in Example 4, developed by immersion in acetone, and annealed for 10 minutes at 180° C., thus producing an etching layer which excellently withstands the attack of acids and side wall protective agents used in the customary quick etching process.

EXAMPLE 7

A polymer prepared by the procedure described in Example 1 from the oxetane derivative corresponding to Formula 13 was used, in a 7 percent solution in dimethyl formamide, for whirl-coating the chromium surface of a trimetal plate made up of layers of steel, copper and chromium. After drying for 5 minutes at 100° C., the plate was exposed for 9 minutes, under a positive screen original, to the light of a 40 amp carbon arc lamp, developed by gently rubbing with a cotton pad soaked in a 7:1 mixture of glycolmonoethyl ether and triethylene glycol, etched for approximately 15 minutes with a conventional etching solution adapted to chromium layers in order to bare the copper layer, and finally rubbed with dimethyl formamide and precipitated chalk by means of a cotton pad, in order to remove the hardened organic layer from the chromium surface. After the plate had been acidified with a 1 percent solution of phosphoric acid and inked up with greasy ink, a trimetal plate is obtained from which positive prints can be printed.

EXAMPLE 8

The solution of the light-sensitive polymer described in Example 7 was used for whirl-coating a bimetal plate consisting of layers of aluminum and copper. After the plate had been dried for 5 minutes at 100° C., it was exposed for 9 minutes under a negative screen original to the light of the tube illuminating apparatus described in Example 4, developed by gently rubbing with a cotton pad soaked in a 7:3 mixture of ethyleneglycol and triethylene glycol, and the bared copper was then etched away with a solution of the following composition: 60% water, 34% $FeCl_3$, 3.3% $HCl$, 2.5% $HNO_3$, and 0.2% $NH_4NO_3$.

After the plate had been treated with dilute sodium metasilicate solution and precipitated chalk (i.e. by rubbing with a cotton pad), it was wiped over with a dilute sulfuric acid solution and inked up with greasy ink. A positive bimetal plate for offset printing is thus produced.

EXAMPLE 9

A copolymer prepared by the method described in Example 1 from 5 parts by weight of the compound of Formula 11, 3 parts by weight of 3,3-bis-chloromethyl-oxetane, and 3 parts by volume of absolute tetrahydrofuran was coated on an electrolytically roughened aluminum foil as a 2 percent solution in a 2:3 mixture of methylglycol and butyl acetate, which also contained 10 percent of Michler's ketone, calculated on the dissolved copolymer. After drying for 2 minutes at 100° C., the plate was exposed for 6 minutes under a negative screen original to the light of a 40 amp carbon arc lamp (distance: 110 cm.), developed by rubbing with a cotton pad soaked in a 4:1 mixture of methylglycol and butylacetate, wiped over with 1 percent phosphoric acid, and inked up with greasy ink. A positive offset printing plate was thus obtained.

EXAMPLE 10

A copolymer prepared by the method described in Example 1 from 5 parts by weight of the compound of Formula 9 and 2 parts by weight of 1,4-epoxy-cyclohexane, was used in a 2 percent solution in ethylene glycol monomethyl ether and butyl acetate (2:3) which contained also 10 percent, based on the copolymer, of Michler's ketone, for coating an electrolytically roughened aluminum foil on a plate whirler. The copolymer prepared with the aid of $BF_3$-etherate as well as the one prepared with $PF_5$ as the polymerization initiating substance may be used.

The foil is dried for 5 minutes at 100° C., exposed under a screen negative to the light of a 40 amp carbon arc lamp from a distance of 110 cm., developed by rubbing with a cotton pad soaked in dimethyl formamide, wiped over with 1 percent phosphoric acid, and inked up with greasy ink. To remove any traces of scumming in the non-image areas, the inked plate is treated by gently rubbing it with a cotton pad soaked in a 7 percent sodium metasilicate solution. The plate thus produced may be used for printing in an offset printing apparatus.

EXAMPLE 11

0.375 part by weight of a copolymer prepared by the method described in Example 1 from 5 parts by weight of propylene oxide and 5 parts by weight of the compound of Formula 5, was dissolved with 0.0375 part by weight of Michler's ketone in 12.5 parts by volume of dimethyl formamide, and the solution thus obtained was used for coating an electrolytically roughened aluminum foil. After the foil had been dried for 5 minutes at 100° C., it was exposed for 5 minutes under a screen negative to the light of a 40 amp carbon arc lamp (distance: 110 cm.), then developed by rubbing with a cotton pad soaked in a 1:1 mixture of ethanol and water, wiped over with 1 percent phosphoric acid, and inked up with greasy ink. Traces of scumming were removed as described in Example 10. The plate thus produced may be used as an offset printing plate.

EXAMPLE 12

0.75 part by weight of a copolymer prepared from 3 parts by weight of the compound of Formula 20 and 2 parts by weight of 3,3-bis-chloro-methyl-oxetane was dissolved with 0.075 part by weight of Michler's ketone in 25 parts by volume of dimethyl formamide; an electrolytically roughened aluminum foil was coated on a plate whirler with this solution. The foil was dried for 5 minutes at 100° C., exposed for 3 to 5 minutes under a screen negative to the light of a 40 amp carbon arc lamp (distance: 110 cm.), developed by rubbing with a cotton pad soaked in dimethyl formamide, wiped with 1 percent phosphoric acid, and inked up with greasy ink. Any traces of scumming in the non-image areas are removed as described in Example 10. The plate thus obtained may be used as an offset printing plate.

EXAMPLE 13

0.5 part by weight of a copolymer prepared by the method described in Example 1 from 3 parts by weight of the compound corresponding to Formula 13 and 2 parts by weight of 3,3-bis-chloro-methyl-oxetane, was dissolved in 25 parts by volume of a 2:3 mixture of ethyleneglycol monomethyl ether and butyl acetate. An electrolytically roughened aluminum foil was coated on a plate whirler with this solution, dried for 2 minutes at 100° C., and then exposed for 2 minutes under a screen negative to the light of a 40 amp three-phase carbon arc lamp (distance: 110 cm). The plate was developed by rubbing with a cotton pad soaked in acetone, wiped over with 1 percent phosphoric acid, and inked up with greasy ink. Traces of scumming in the non-image areas are removed as described in Example 10. The plate may serve as an offset printing plate.

EXAMPLE 14

0.75 part by weight of a copolymer prepared by the method described in Example 1 from 3 parts by weight of the chalcone of Formula 13 and 0.5 part by weight of 3,3-bis-cyanomethyl-oxetane, was dissolved in 25 parts by volume of a 2:3 mixture of ethylene glycol monomethyl ether and butyl acetate. An electrolytically roughened aluminum foil was coated on the plate whirler with this solution. The foil was dried for 5 minutes at 100° C., then exposed for 5 minutes under a screen negative to the light of a 40 amp three-phase carbon arc lamp, developed by rubbing with a cotton pad soaked in dimethyl formamide, wiped over with 1 percent phosphoric acid, and inked up with greasy ink. The plate thus produced may be used as an offset printing plate.

EXAMPLE 15

0.75 part by weight of a copolymer prepared by the method described in Example 1 from 5 parts by volume of tetrahydrofuran and 10 parts by weight of the compound corresponding to Formula 13 was dissolved in 25 parts by volume of dimethyl formamide. The solution was used for coating an electrolytically roughened aluminum foil on a plate whirler. After drying the plate for 5 minutes at 100° C., it was exposed for 2 minutes under a screen negative to the light of a 40 amp carbon arc lamp, developed by rubbing with a cotton pad soaked in dimethyl formamide, acidified with 1 percent phosphoric acid, and inked up with greasy ink. Traces of scumming which may be present in the non-image areas was removed as described in Example 10. The plate may be used as an offset printing plate.

EXAMPLE 16

0.5 part by weight of a copolymer prepared by the method described in Example 1 from 3 parts by weight of the compound of Formula 13, 2 parts by weight of 3,3-bis-chloromethyl-oxetane, and 1 part by weight of 3,3-bis-acetoxy-methyl-oxetane, were dissolved in 25 parts by volume of a 2:3 mixture of glycol monomethyl ether and butyl acetate. An electrolytically roughened aluminum foil was coated on a plate whirler with this solution. The plate was then dried for 2 minutes at 100° C., exposed for 2 minutes under a screen negative to the light of a 40 amp three-phase carbon arc lamp, developed by rubbing with a cotton pad soaked in acetone, wiped over with 1 percent phosphoric acid, and inked up with greasy ink. Traces of scumming adhering to the non-image areas were removed as described in Example 10. The plate thus produced may be used as an offset printing form.

EXAMPLE 17

0.75 part by weight of a copolymer prepared by the method described in Example 1 from 4 parts by weight of the compound corresponding to Formula 13, 1 part by weight of 3,3-bis-iodomethyl-oxetane, and 1 part by volume of tetrahydrofuran, were dissolved in 25 parts by volume of dimethyl formamide. An electrolytically roughened aluminum foil was coated on a plate whirler with this solution. The foil was dried for 5 minutes at 100° C., then exposed for 2 to 3 minutes under a screen negative to the light of a 40 amp three-phase carbon arc lamp, developed by rubbing with a cotton pad soaked in dimethyl formamide, wiped over with 1 percent phosphoric acid, and inked up with greasy ink. Traces of scumming in the non-image areas were removed as described in Example 10. A positive offset printing form is thus obtained.

EXAMPLE 18

0.75 part by weight of a copolymer prepared by the method described in Example 1 from 3.4 parts by weight of the compound of Formula 18 and 1.7 parts by volume of tetrahydrofuran was dissolved in 25 parts by volume of a 1:1 mixture of glycol monomethylether and dimethylformamide. An aluminum foil was coated with this solution as described in the preceding examples; the plate was dried for 5 minutes at 100° C., then image-wise exposed for 2 to 3 minutes under a negative, using a 40 amp carbon arc lamp, developed with dimethyl formamide by means of a cotton pad, wiped over with 1 percent phosphoric acid, and inked up with greasy ink. Traces of scumming were removed as in Example 10. A positive offset printing plate is thus obtained.

EXAMPLE 19

0.75 part by weight of a copolymer prepared as described in Example 1 from 5 parts by weight of the compound of Formula 17 and 2 parts by weight of 3,3-bis-chlor-ethyl-oxetane, was dissolved at 25 parts by volume of a 2:3 mixture of glycol monomethylether and butyl acetate. An aluminum foil was coated with this solution as described in the preceding examples, dried for 5 minutes at 100° C., image-wise exposed for 8 minutes under a 40 amp carbon arc lamp, developed with dimethyl formamide by means of a cotton pad, acidified, and inked up. A positive offset plate was thus obtained.

EXAMPLE 20

0.75 part by weight of a copolymer prepared by the method described in Example 1 from 1 part by weight of the compound of Formula 12 ($n=3$) and 10 parts by volume of tetrahydrofuran, was dissolved in 25 parts by volume of cyclohexanone. An aluminum foil was coated with this solution as described in the preceding examples, dried for 5 minutes at 100° C., image-wise exposed for 2 to 3 minutes to a 40 amp carbon arc lamp, developed with ethyl acetate by means of a cotton pad, rendered acidic, and inked up. Traces of scumming in the non-image areas were removed as described in Example 10. A positive offset plate is thus obtained.

It will be obvious to those skilled in the art that many modifications may be made within the scope of the present invention without departing from the spirit thereof, and the invention includes all such modifications.

What is claimed is:

1. A light-sensitive reproduction layer comprising at least one light-sensitive polymer of at least one oxetane of the general Formula I

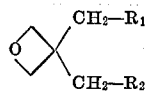

in which $R_1$ is selected from the group consisting of

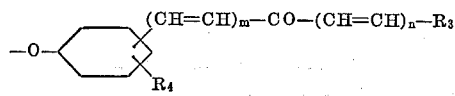

and

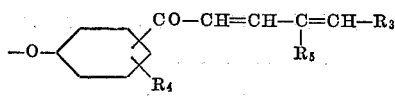

$R_2$ is selected from the group consisting of hydrogen, halogen, alkyl, alkoxy, aryloxy, or the group $R_1$; $R_3$ is selected from the group consisting of a carbocyclic or heterocyclic aromatic group linked through a carbon atom of the ring; $R_4$ is selected from the group consisting of hydrogen, halogen, alkyl, and alkoxy groups; $R_5$ is selected from the group consisting of chloro and phenyl groups; $m$ is 0 or 1; and $n$ is 0 or an integer from 1 to 4.

2. A light-sensitive reproduction layer according to claim 1 in which the light-sensitive polymer is a homopolymer.

3. A light-sensitive reproduction layer according to claim 1 in which the light-sensitive polymer is a copolymer of the oxetane of Formula I with at least one non-light-sensitive compound selected from the group consisting of an oxirane, an oxetane, and an oxolane.

4. A light-sensitive reproduction layer according to claim 1 in which the light-sensitive polymer is a copolymer of the oxetane of Formula I with at least one compound selected from the group consisting of propylene oxide; styrene oxide;

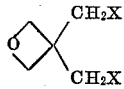

in which X is selected from the group consisting of hydrogen, halogen, alkyl, alkoxy, and aryloxy groups; tetrahydrofuran, and 1,4-epoxycyclohexane.

5. A light-sensitive reproduction layer according to claim 1 containing a light-sensitive polymer of at least one oxetane of the general Formula I in which the sum of $m+n$ is at least 1 but not greater than 2 when $m=1$.

6. A light-sensitive reproduction layer according to claim 1 in which the light-sensitive polymer contains at least 10 mole percent of groups derived from an oxetane of the general Formula I wherein $m=0$, $n=2$ or 3, and $R_2$ is selected from the group consisting of hydrogen, halogen and alkyl.

7. A light-sensitive reproduction layer according to claim 1 on a support suitable for use in planographic printing.

8. A light-sensitive reproducton layer according to claim 1 in which the light-sensitive oxetane has the formula

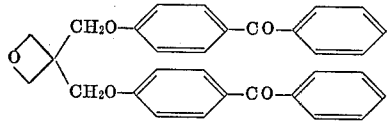

9. A light-sensitive reproduction layer according to claim 1 in which the light-sensitive oxetane has the formula

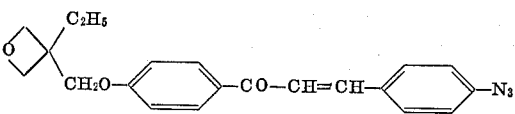

10. A light-sensitive reproduction layer according to claim 1 in which the light-sensitive oxetane has the formula

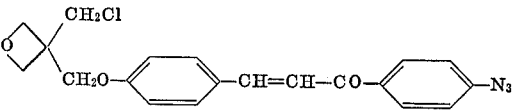

11. A light-sensitive reproduction layer according to claim 1 in which the light-sensitive oxetane has the formula

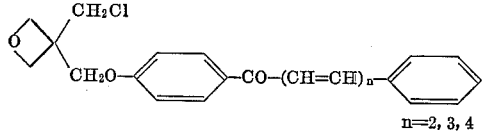

$n=2, 3, 4$

12. A light-senistive reproduction layer according to claim 1 in which the light-sensitive oxetane has the formula

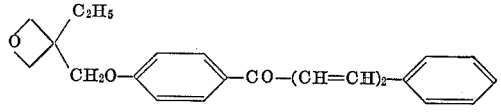

13. A process for making a printing plate which comprises exposing a supported light-sensitive reproduction layer to light under a master and developing the resulting image, the layer comprising a light-sensitive polymer of at least one oxetane of the general Formula I

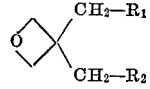

in which $R_1$ is selected from the group consisting of

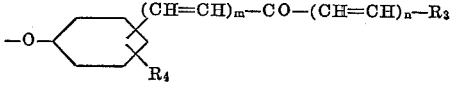

and

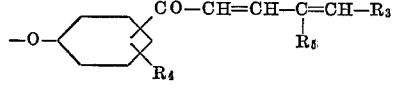

$R_2$ is selected from the group consisting of hydrogen, halogen, alkyl, alkoxy, aryloxy, or the group $R_1$; $R_4$ is selected from the group consisting of a carbocyclic or heterocyclic aromatic group linked through a carbon atom of the ring; $R_4$ is selected from the group consisting of hydrogen, halogen, alkyl, and alkoxy groups; $R_5$ is selected from the group consisting of chloro and phenyl groups; $m$ is 0 or 1; and $n$ is 0 or an integer from 1 to 4.

14. A process according to claim 13 in which the light-sensitive polymer is a homopolymer.

15. A process according to claim 13 in which the light-sensitive polymer is a copolymer of the oxetane of Formula I with at least one non-light-sensitive compound selected from the group consisting of an oxirane, an oxetane and an oxolane 16. A process according to claim 13 in which the light-sensitive polymer is a copolymer of the oxetane of Formula I with at least one compound selected from the group consisting of propylene oxide; styrene oxide;

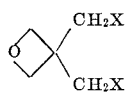

in which X is selected from the group consisting of hydrogen, halogen, alkyl, alkoxy, and aryloxy groups; tetrahydrofuran, and 1,4-epoxycyclohexane.

17. A process according to claim 13 in which the light-sensitive polymer is a polymer of at least one oxetane of the general Formula I in which the sum of $m+n$ is at least 1 but not greater than 2 when $m=1$.

18. A process according to claim 13 in which the light-sensitive polymer contains at least 10 mole percent of groups derived from an oxetane of the general Formula I wherein $m=0$, $n=2$ or 3, and $R_2$ is selected from the group consisting of hydrogen, ahlogen, and alkyl.

19. A process according to claim 13 in which the light-sensitive oxetane has the formula

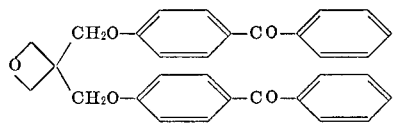

20. A process according to claim 13 in which the light-sensitive oxetane has the formula

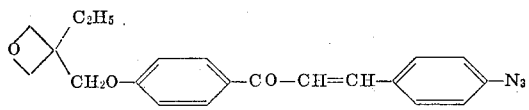

21. A process according to claim 13 in which the light-sensitive oxetane has the formula

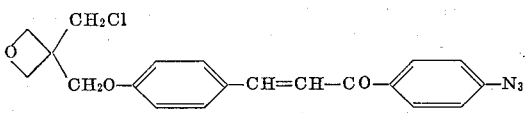

22. A process according to claim 13 in which the light-sensitive oxetane has the formula

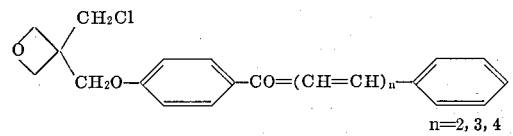

23. A process according to claim 13 in which the light-sensitive oxetane has the formula

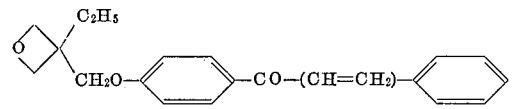

References Cited
UNITED STATES PATENTS
3,409,593 11/1968 Messwarb et al. ___ 96—115 XR NORMAN G. TORCHIN, Primary Examiner
R. H. SMITH, Assistant Examiner U.S. Cl. X.R.
96—115; 260—47, 2